United States Patent [19]
Tiggesbäumker et al.

[11] Patent Number: 4,808,108
[45] Date of Patent: Feb. 28, 1989

[54] METHOD AND APPARATUS FOR THE HEAT TREATMENT OF FINE-GRAINED MATERIAL

[75] Inventors: Peter Tiggesbäumker; Manfred Dürr, both of Oelde; Jürgen Wurr, Ennigerloh; Karl Krützner, Beckum; Wolfgang Rother, Oelde; Karl Menzel, Ennigerloh; Frank Schaberg, Oelde; Heinrich Klockenbusch, Ahlen; Georg Unland, Ennigerloh; Günter Driemeier, Lienen, all of Fed. Rep. of Germany

[73] Assignee: Krupp Polysius AG, Fed. Rep. of Germany

[21] Appl. No.: 102,283

[22] Filed: Sep. 28, 1987

Related U.S. Application Data

[63] Continuation of Ser. No. 837,302, Mar. 7, 1986, abandoned.

[30] Foreign Application Priority Data

Mar. 22, 1985 [DE] Fed. Rep. of Germany ....... 3510501
Jun. 21, 1985 [DE] Fed. Rep. of Germany ....... 3522272

[51] Int. Cl.⁴ .............................................. F27B 15/06
[52] U.S. Cl. ...................... 432/14; 432/106; 432/78; 110/345
[58] Field of Search ............. 432/78, 14, 58, 106; 110/347, 345

[56] References Cited

U.S. PATENT DOCUMENTS

| | | | |
|---|---|---|---|
| 3,595,544 | 7/1971 | Curtis | 432/34 |
| 4,002,420 | 1/1977 | Christiansen | 432/14 |
| 4,066,470 | 1/1978 | Brachthanser et al. | 432/106 |
| 4,201,546 | 5/1980 | Herchenbach et al. | 432/58 |
| 4,248,639 | 2/1981 | Quittkat | 432/106 |
| 4,257,766 | 3/1981 | Ritzmann et al. | 432/14 |
| 4,335,084 | 6/1982 | Brogan | 110/345 |
| 4,402,667 | 9/1983 | Goldmann | 432/14 |
| 4,514,170 | 4/1985 | Kupper | 432/14 |
| 4,528,918 | 7/1985 | Sato et al. | 110/345 |
| 4,530,661 | 7/1985 | Herchenbach | 432/106 |
| 4,557,688 | 12/1985 | Nielsen | 432/106 |
| 4,568,276 | 2/1986 | Fujisawa | 432/106 |
| 4,579,526 | 4/1986 | Kreft et al. | 432/14 |
| 4,616,576 | 10/1986 | Evestrom et al. | 110/345 |
| 4,640,681 | 2/1987 | Steinbiss et al. | 432/14 |
| 4,699,071 | 10/1987 | Vier et al. | 110/345 |

FOREIGN PATENT DOCUMENTS

| | | | |
|---|---|---|---|
| 124436 | 9/1981 | Japan | 432/106 |
| 125253 | 10/1981 | Japan | 432/106 |

*Primary Examiner*—Henry C. Yuen
*Attorney, Agent, or Firm*—Learman & McCulloch

[57] ABSTRACT

The heat treatment of fine-grained material wherein two quantities of fuel are delivered to a precalcination zone at two different levels. The first quantity of fuel is delivered at a lower level nearer the combustion zone and the oxygen content of the gases passing through this region of the precalcination zone are such that in this region a substoichiometric combustion takes place and a CO content between 0.05% and 1% is established. As a result a reducing decomposition of the $NO_x$ content of the exhaust gases from the combustion zone takes place.

10 Claims, 4 Drawing Sheets

METHOD AND APPARATUS FOR THE HEAT TREATMENT OF FINE-GRAINED MATERIAL

This is a continuation of co-pending application Ser. No. 837,302, filed on Mar. 7, 1986, now abandoned.

The invention relates to a method and apparatus for the heat treatment of fine-grained material, especially in the production of cement.

BACKGROUND OF THE INVENTION

A method of the general class to which the invention relates is disclosed in German Patent Specification A-27 24 654 and Japanese Patent Specification A-26 410/1972.

In the method according to German Patent Specification the precalcination zone is divided, in the direction along which the material passes, into at least two reaction zones each of which is supplied separately with heat from the combustion of fuel. Before the material is delivered to the succeeding or downstream lower reaction zone it is separated from the hot gases of the upper reaction zone. Whereas only the exhaust gases from the combustion zone are delivered to the lower reaction zone, the upper reaction zone also receives combustion air from the cooling zone.

In the method according to the Japanese Patent Specification the two lowest cyclones of a multi-stage cyclone preheater form the precalcination zone which is supplied with additional fuel and through which the exhaust gases from the combustion zone (i.e., the rotary kiln) flow and to which additional combustion air, divided into the two branch air streams, is also delivered from the cooling zone.

In the known methods the exhaust gases from the combustion zone generally contain a more or less large proportion of nitrogen oxide (so-called $NO_x$ content). These nitrogen oxides are formed partly by reaction of oxygen with nitrogen in the combustion air and partly by oxidation of the nitrogen compounds in the fuel (cf. German periodical "Zement-Kalk-Gips", 6/1980, 310–313).

The $NO_x$ content of the exhaust gases from the combustion zone is undesirable, and not only because of the exhaust gas problems caused thereby. The object of the invention, therefore, is to improve the known methods so that the $NO_x$ content of the exhaust gases is reduced.

SUMMARY OF THE INVENTION

According to the invention, at a first or lower fuel charging point located in the precalcination zone and near the combustion zone such a quantity of fuel is added with relation to the oxygen content of the gases in the lower region of the precalcination zone as to establish a sub-stoichiometric combustion and a CO content between about 0.05 and 1%, and preferably between 0.2 and 0.8%. In this way reducing conditions are produced in the lower region of the precalcination zone which result in a decomposition of the $NO_x$ content of the exhaust gases from the combustion zone by the reaction of the carbon monoxide with the nitrogen oxides to from nitrogen and carbon dioxide.

According to the invention the oxygen content in the lower region of the precalcination zone is controlled by introducing combustion air from the cooling zone into the precalcination zone in the region of the two fuel charging points in the form of at least two branch streams. Thus, according to the invention there is already a controlled delivery of air at the first fuel charging point. In this way it is possible not only to establish a desired CO content in the region of the first fuel charging point but at the same time to produce a controllable quantity of CO.

In order to assist the decomposition of the $NO_x$ content in the first region of the precalcination zone, it is advantageous if a proportion of the material is also introduced into this region of the precalcination zone at the same time. On the one hand this material has a catalytic effect on the reaction of the CO with the nitrogen oxide and at the same time it serves to control the temperature in this region of the precalcination zone, since it takes up the heat produced by the combustion by deacidification.

Therefore, according to an advantageous embodiment of the invention the material preheated in the preheating zone is introduced into the precalcination zone in the region of the two fuel charging points in the form of at least two controllable quantities.

Since the $NO_x$ content of the exhaust gases from the combustion zone is subject to certain variations depending upon the combustion conditions in operation, it is advantageous to measure the $NO_x$ concentration in the exhaust gases from the combustion zone before entry into the precalcination zone and to set the CO content in the precalcination zone in the region of the first fuel charging point according to this measured $NO_x$ value. The higher the measured $NO_x$ value is, the higher the CO content in the first region of the precalcination zone must be chosen to achieve a sufficient reduction of the $NO_x$ content. The choice of CO concentrations over approximately 1% is in any case not generally advantageous because of the associated danger of the formation of deposits.

The division of the combustion air delivered from the cooling zone is basically carried out as a function of the division of the fuel at the two fuel charging points.

THE DRAWINGS

A preferred embodiment of apparatus is illustrated in the drawings, in which.

DETAILED DESCRIPTION

Figure 1:
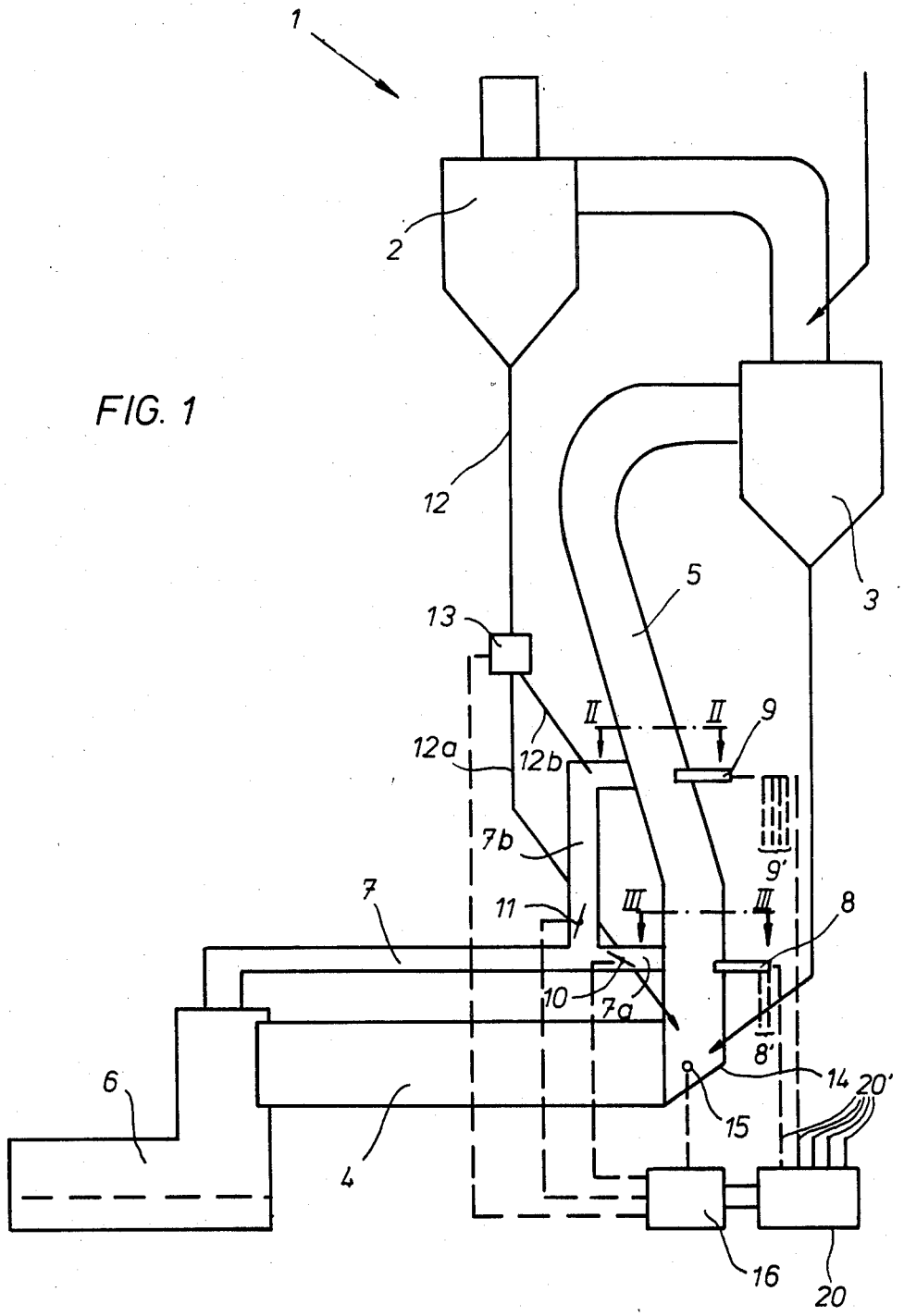
FIG. 1 is a schematic representation of apparatus according to the invention.

The apparatus disclosed in FIG. 1 for the heat treatment of fine-grained material, and particularly for the production of cement, includes a multi-stage, suspended, gas heat exchanger 1 which forms the preheating zone, and of which only the two lowest cyclones 2 and 3 are shown. The apparatus also includes a rotary kiln 4 which forms the combustion zone, an exhaust gas pipe 5 which connects the rotary kiln 4 to the suspended gas heat exchanger 1 and forms the precalcination zone, and a cooler 6 which forms the cooling zone and is connected to the precalcination zone (gas pipe 5) by a cooling air pipe 7.

The gas pipe 5 forming the precalcination zone has two longitudinally spaced fuel charging points 8 and 9 which comprise in each case a plurality of fuel chargers 8', 9' (e.g., a plurality of coal blowing pipes) provided in different positions.

A cooling air pipe 7 connects the cooler 6 to the precalcination zone and is divided into two cooling air branch pipes 7a, 7b which open into the gas pipe 5 at two longitudinally spaced points from one another in the region of the two fuel charging points 8 and 9.

Means is provided for distributing the combustion air delivered from the cooler 6 to the two cooling air branch pipes 7a, 7b, and in this embodiment comprises two valves 10, 11 positioned in these pipes.

The material discharge pipe 12 from the second lowest stage formed by the cyclone 2 of the suspended gas heat exchanger 1 is divided into two material pipes 12a, 12b, of which the material pipe 12a in the illustrated embodiment opens into the gas pipe 5 forming the precalcination zone (adjacent and below the fuel charging point 8), whereas the material pipe 12b opens into the cooling air branch pipe 7b upstream of its connection to the gas pipe 5.

A distributor 13 (which is only indicated schematically) is also provided for controllably distributing the material discharged from the second lowest stage cyclone 2 of the suspended gas heat exchanger 1 to the two material pipes 12a, 12b.

Figure 2:
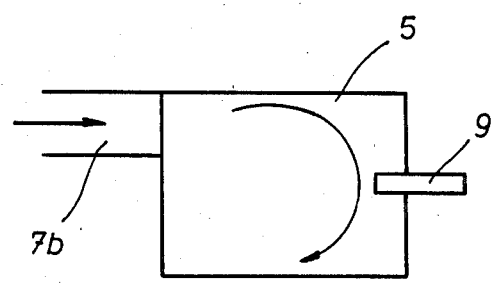
FIGS. 2 and 3 are sections through the precalcination zone taken along the lines II—II and III—III, respectively, of FIG. 1.
Figure 3:
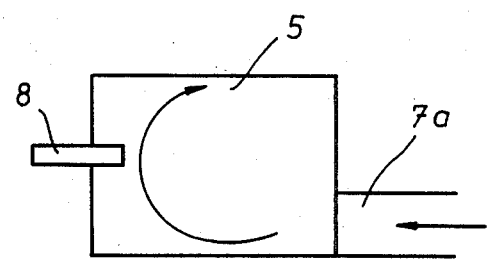

FIGS. 2 and 3 show an embodiment of the opening of the cooling air branch pipes 7a and 7b into the gas pipe 5. The two cooling air branch pipes 7a, 7b open tangentially into the gas pipe 5 which forms the precalcination zone and produce two rotational flow patterns in the same direction. However, instead of this arrangement it is also possible to select the opening of the two cooling air branch pipes 7a, 7b in such a way that in the region of the two fuel charging points 8 and 9 rotational flow patterns in opposite directions are produced in the gas pipe 5. The gas pipe 5 can also of course have a round cross-section.

Figure 4:
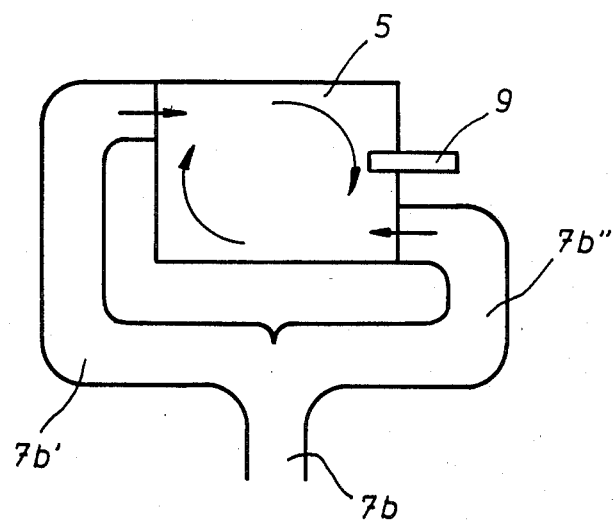
FIGS. 4 and 5 are diagrammatic sections of variants of the constructions for the introduction of air into the precalcination zone.

In the variant illustrated in FIG. 4 the cooling air branch pipe 7b is divided before it opens into the gas pipe 5 into two pipe end ducts 7b', 7b" which open tangentially from opposite side into the gas pipe 5, thereby producing a rotational flow pattern in the same direction at different peripheral points. Naturally, a corresponding arrangement can also be chosen for the other cooling air branch pipe 7a.

In order to measure the $NO_x$ content of the exhaust gases from the rotary kiln 4, a known measuring device 15 which is connected to a known regulator 16 is provided in the region of the inlet housing 14 of the rotary kiln. This regulator 16 is also connected by means of pipes indicated by broken lines to a fuel distributor 20, the valves 10 and 11, and the distributor 13 for dividing the material stream.

The illustrated apparatus functions as follows:

The fine-grained material is first of all preheated in the preheating zone formed by heat exchanger 1 by means of the hot exhaust gases from the precalcination zone. It is then further heated in the precalcination zone which is supplied with additional fuel and deacidified (precalcined) before final burning in the rotary kiln 4, which forms the combustion zone, and cooling in the cooler 6.

The lower region of the precalcination zone formed by the gas pipe 5 serves in the apparatus according to the invention not only for deacidification of the preheated material introduced via the material pipe 12a, but also for reduction of the $NO_x$ content of the exhaust gases from the rotary kiln 4. For this purpose a selected quantity of fuel is introduced via the fuel charging point 8 into this lower region of the gas pipe 5 and at the same time the quantity of combustion air delivered via the cooling air branch pipe 7a is so selected that in this lower region of the gas pipe 5 a sub-stoichiometric combustion takes place and a CO content between about 0.05% and 1%, and preferably between about 0.2% and 0.8%, is established. Under these reducing conditions the nitrogen oxides contained in the exhaust gases from the rotary kiln 4 are largely decomposed to nitrogen and $CO_2$. The material introduced into this lower region of the gas pipe 5 via the material pipe 12a has a catalytic effect on the nitrogen removal and at the same time serves to control the temperature in this region since it takes up deacidification the heat produced by the combustion.

In the farther upward region of the gas pipe 5 additional fuel is introduced via the fuel charging point 9, further air for combustion is introduced via the cooling air branch pipe 7b, and the remainder of the material is introduced via the material pipe 12b. In this region of the gas pipe 5 the combustion of the CO emerging from the lower part of the gas pipe 5 takes place, as well as the combustion of the further fuel delivered via the charging point 9.

The quantity of combustion air introduced into the lower region of the precalcination zone via the cooling air branch pipe 7a can be varied for example between 0 and 50% in order to ensure the necessary CO atmosphere for the $NO_x$ decomposition in this region of the gas pipe 5. The quantities of fuel and material are set accordingly.

The quantity of combustion air introduced into the second region of the precalcination zone via the cooling air branch pipe 7b is then variable between 50% and 100%, and thus the burning of the remainder of the CO produced and the burning of the fuel delivered via the charging point 9 can be regulated. The length of the region of the precalcination zone in which the reducing conditions prevail can be varied according to the requirements. For this purpose it is also possible to alter the height of the fuel charging point 8.

As can be seen from the above description, a substoichiometric combustion should take place and CO should be produced at the lower level of the fuel charging point 8, resulting in a reduction of the $NO_x$ discharged from the rotary kiln 4. The combustion of the rest of the CO and fuel should then take place at the higher level of the fuel charging point 9. Since the quantities of oxygen in the two levels differ in the different operating states and the exact mass flows of gas, fuel, and material can only be set upon optimisation of the kiln operation when it is put into operation, the quantity of fuel must be capable of being varied in the upper and lower levels. When coal dust is used as fuel, as it often is, there are also certain limitations on the coal delivery side. The charging of the conveying air with coal should be as high as possible in order to keep the heat consumption of the kiln apparatus as low as possible (loading approximately 6 kg coal/kg air); the conveying of the coal should also take place with the least possible pulsation (Froude number $\geq 25$).

In an advantageous variant of the invention, therefore, a modular introduction of the fuel (coal dust) into the precalcination zone takes place. As indicated in FIG. 1, the whole fuel stream is distributed in the cup-shaped distributor 20 to (for example) five pipes (fuel outlets 20'). Three chargers 8' for example lead into the lower level, i.e., to the fuel charging point 8, and five pipes for example lead into the upper level (fueld charging point 9). These eight pipes can be connected as desired to the five outlets from the distributor 20. In this way the quantity of fuel can be set at both levels in 20% stages of the total quantity of fuel provided for the precalcination. The fine regulation of the combustion is then carried out with the valves 10 and 11 in the pipes 7a, 7b.

Figure 5:
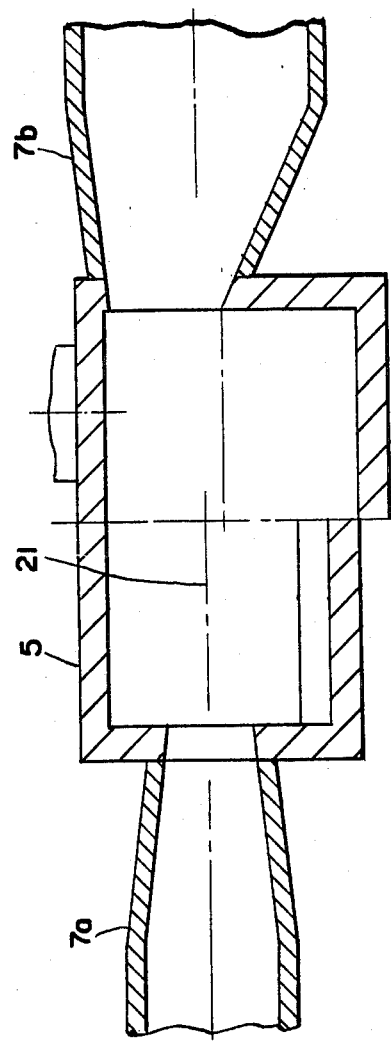

FIG. 5 shows a further advantageous variant of the opening of the cooling air branch pipes 7a and 7b into the gas pipe 5. FIG. 5 should be understood as a section stepped in height through the gas pipe 5, in which the lefthand half of FIG. 5 shows the situation at the level of the opening of the pipe 7a and the right-hand half of FIG. 5 shows the situation in the region of the opening of the pipe 7b (at the level of the opening of the pipe 7b the gas pipe 5 has a somewhat larger cross-section than at the level of the opening of the pipe 7a). The arrangement of the fuel chargers 8' and 9' and the fuel pipes leading to the distributor 20 are not shown in FIG. 5 for the sake of greater clarity.

As can been seen from FIG. 5, the lower cooling air branch pipe 7a opens centrally into the gas pipe 5; the axis of the pipe 7a, therefore, lies approximately in the vertical central plane 21 of the gas pipe 5. Advantageously the branch pipe 7a is also inclined downwards so that the combustion air delivered via the pipe 7a enters the gas pipe 5 in counterflow to the kiln exhaust gas stream. By means of this central opening of the pipe 7a a uniform CO development over the whole cross-section of the gas pipe 5 is achieved. In this way gas streams from the rotary kiln 4 which are high in $NO_x$ are prevented from flowing past the CO-containing gases.

By contrast, the upper cooling air branch pipe 7b opens tangentially into the gas pipe 5. In this way a strong turbulence is achieved in this region of the precalcination zone which ensures a good combustion of the remaining CO and the remaining fuel.

Figure 6:
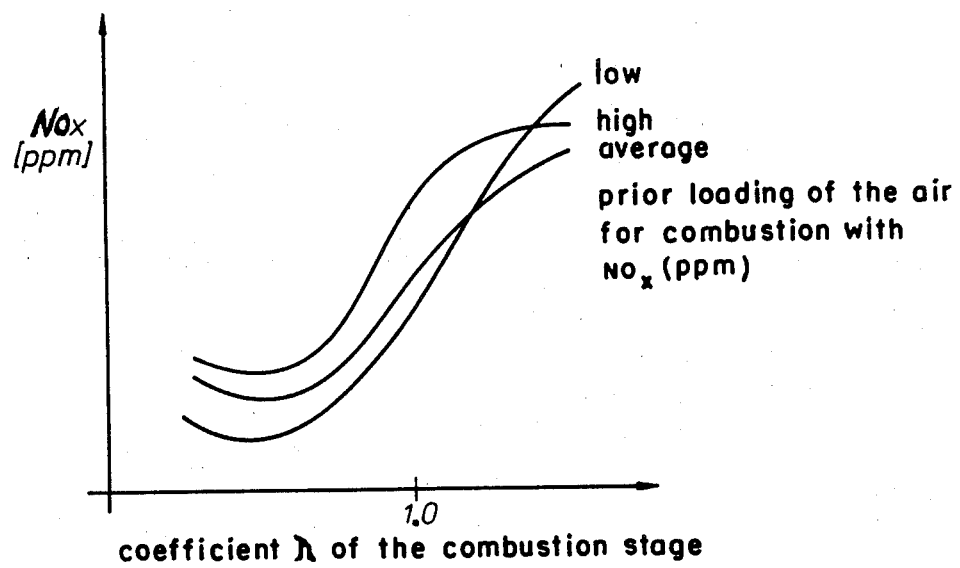
FIG. 6 is a diagram useful in the explanation of the functioning of the apparatus.

FIG. 6 will be referred to in connection with the description of a working example for further explanation of the invention.

The reaction chain for the formation of $NO_x$ from nitrogen in the air and in the fuel runs over many competing reactions and presupposes the presence of radicals such as $NH_2$, CN, OH, H, N, O, etc. It is not only the individual formation reactions to $NO_x$ which are important here, but also the reverse reactions from $NO_x$ to elementary $N_2$.

In particular the presence of CH radicals favors the reverse reaction to $N_2$, that is to say the decomposition of $NO_x$. By a specific progressive combustion with heating carried out sub-stiochiometrically a decomposition of $NO_x$ can be achieved by means of the radical reactions. In this respect there is a tendency towards the dependence illustrated in FIG. 6 (between the $NO_x$ formed and the excess air coefficient $\chi$ of the combustion stage, where the prior loading of the air for combustion with $NO_x$ is chosen as a parameter). In absolute values, this dependence in principle differs for each fuel, the geometry of each combustion chamber, and each burner.

By the variability of the manner of operation of the two fuel charging points the present invention facilitates a control which comes close to the point of minimal $NO_x$ production according to FIG. 6.

In a practical embodiment of the method according to the invention using apparatus according to FIG. 1 the following analysis values are produced at the individual points of the apparatus, and the $NO_x$ reduction achieved will be recognized from the pattern of the NO values:

Distribution of air to the cooling air branch pipes 7a, 7b ("kg cl" designates "per kg clinker"):
Quantity of air in pipe 7: $0.51 m^3_n$/kg cl
Quantity of air in pipe 7a: $0.09 m^3_n$/kg cl
Quantity of air in pipe 7b: $0.42 m^3_n$/kg cl
Gas analysis values at the gas discharge end of the rotary kiln 4:
Quantity of gas = $0.52 m^3_n$/kg cl
$CO_2$ = 23.0%
$O_2$ = 2.0%
CO = 0.03%
NO = 1800 ppm
= 1.18 g NO/kg cl
$\chi$ = 1.11
Fuel charging point 8:
Quantity of fuel delivered = 500 kJ/kg cl.
Gas analysis values in the gas pipe 5 (between the fuel charging points 8 and 9):
Quantity of gas = $0.68 m^3_n$/kg cl
$CO_2$ = 30.0%
$O_2$ = 0
CO = 0.5%
NO = 390 ppm
= 0.34 g NO/kg cl
$\chi$ = 0.95
Fuel charging point 9:
Quantity of fuel delivered 1170 kJ/kg cl
Gas analysis values in the gas pipe 5 (above the fuel charging point 9):
Quantity of gas = $1.34 m^3_n$/kg cl
$CO_2$ = 32.6%
$O_2$ = 2.6%
CO = 0.06%
NO = 350 ppm
= 0.60 g NO/kg cl
$\chi$ = 1.18

We claim:

1. In a method of heat treating fine-grained material wherein:
(a) the material first is preheated in a preheating zone using hot exhaust gases from a precalcination zone;
(b) such material then is further heated and deacidified in said precalcination zone by the combustion of additional fuel;
(c) the material then undergoes final burning in a combustion zone and subsequently is cooled in a cooling zone;
(d) exhaust gases from the combustion zone are supplied to the precalcination zone;
(e) the additional fuel is delivered in at least two quantities at levels vertically spaced from one another in the direction of flow of gases passing through the precalcination zone; and
(f) preheated combustion air is delivered to the precalcination zone from the cooling zone in the regions of the fuel charging levels in separate streams;

the improvement comprising:
(g) dividing and introducing said material into the precalcination zone in at least two streams introduced respectively into the regions of at least two of the fuel charging levels;

(h) measuring the $NO_x$ concentration in the exhaust gases upstream of the precalcination zone;

(i) adjusting in response to such measurement the relationship among combustion air, fuel, and material introduced into the precalcination zone in the region thereof lying closer to the combustion zone to produce sub-stoichiometric combustion of said additional fuel and establish a CO content in that region for decomposition and reduction of the $NO_x$ content in the lower region of the precalcination zone; and (j) determining the relationship among combustion air, fuel, and material introduced at a further upper level in said precalcination zone for combustion of CO produced at a lower region of the precalcination zone as well as fuel delivered at that level.

2. In a method of heat treating fine-grained material wherein:

(a) the material first is preheated in a preheating zone using hot gases from a precalcination zone;

(b) such material then is further heated and deacidified in said precalcination zone by the combustion of additional fuel;

(c) the material then undergoes final burning in a combustion zone and subsequently is cooled in a cooling zone;

(d) exhaust gases from the combustion zone are supplied to the precalcinatin zone;

(e) the additional fuel is delivered in at least two quantities at levels vertically spaced from one another in the direction of flow of gases passing through the precalcination zone; and (f) preheated combustion air is introduced into the precalcination zone in the regions of the fuel charging levels in separate streams;

the improvement comprising:

(g) measuring the $NO_x$ content of exhaust gases from said combustion zone upstream from said precalcination zone; and (h) adjusting the relative proportions of the additional fuel and the combustion air in the region of the precalcination zone lying closer to the combustion zone to produce sub-stoichiometric combustion of said additional fuel and establish a CO content of between about 0.05% and 1%, thereby producing reducing conditions in the precalcination zone for decomposition of the $NO_x$ content of the exhaust gases.

3. The method according to claim 2 including introducing said material into the precalcination zone in at least two streams in the regions of the two fuel charging levels.

4. The method according to claim 2 including dividing the material at the two charging levels in the precalcination zone in such manner as to achieve the maximum reduction of the $NO_x$ content in the region of the first fuel charging level.

5. The method according to claim 2 including dividing the combustion air from the cooling zone as a function of the quantities of fuel discharged at the two fuel charging levels.

6. The method according to claim 2 including introducing said combustion air centrally into the precalcination zone at the first fuel charging level lying nearer the combustion zone and substantially in counterflow to the exhaust gases from the combustion zone.

7. The method according to claim 2 including introducing said combustion air from said cooling zone into said precalcination zone substantially tangentially thereof.

8. The method according to claim 2 wherein the lower of said streams of combustion air is introduced to said precalcination zone in counterflow to the exhaust gases and the upper of said streams of combustion air is introduced to said precalcination zone tangentially thereof.

9. The method according to claim 2 wherein the CO content is between about 0.2% and 0.8%.

10. The method according to claim 2 wherein measuring the $NO_x$ content of said exhaust gases occurs between said combustion zone and said precalcination zone.

* * * * *